March 3, 1953    N. R. CARLSON    2,630,346
COMBINED DISSOLVER AND SPRINKLER CONTROL DEVICE
Filed Aug. 22, 1949
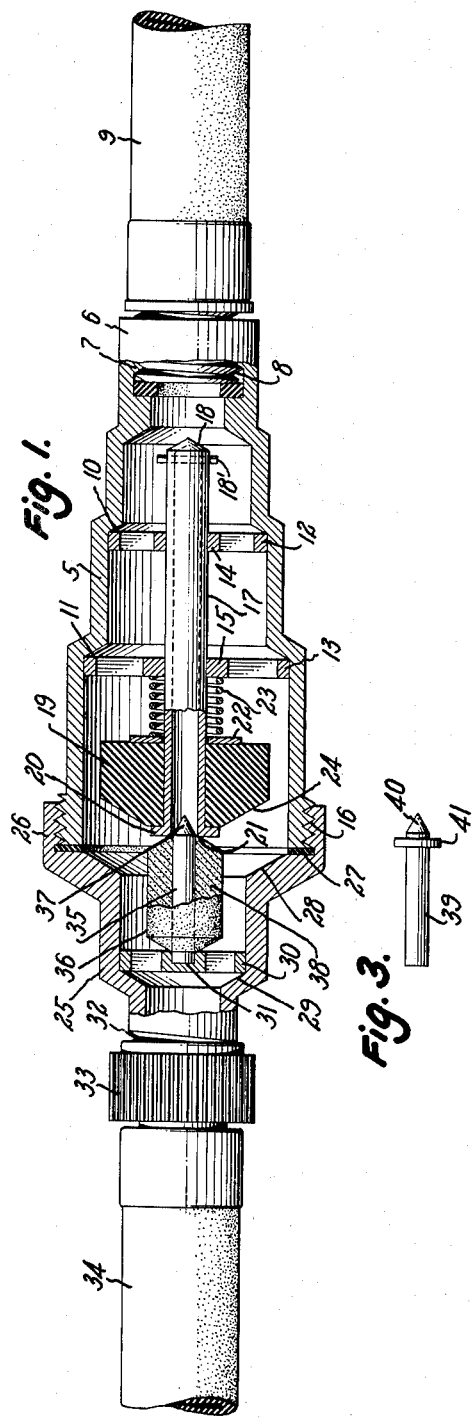
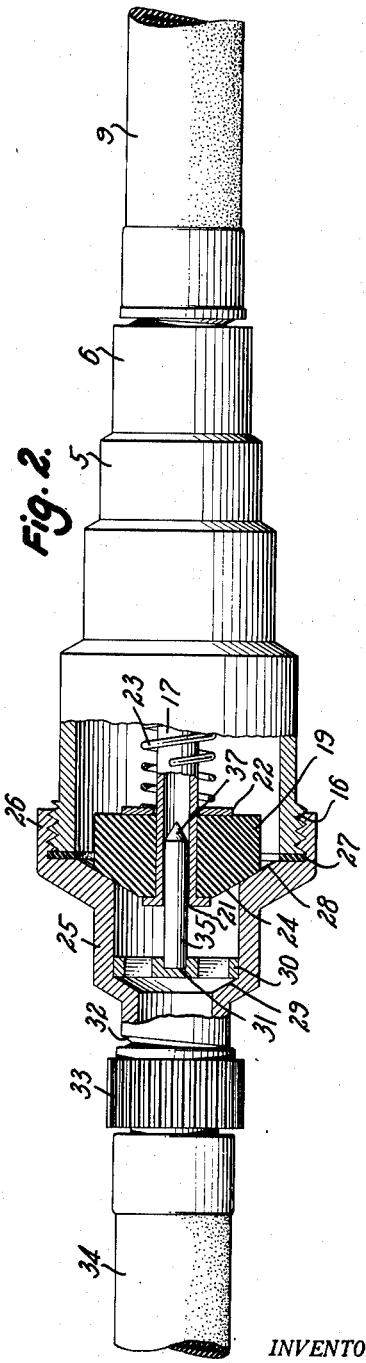
INVENTOR:
Noble R. Carlson,
BY:
Pierce, Scheffler & Parker,
Attorneys.

Patented Mar. 3, 1953

2,630,346

UNITED STATES PATENT OFFICE 2,630,346

COMBINED DISSOLVER AND SPRINKLER CONTROL DEVICE

Noble R. Carlson, McPherson, Kans., assignor to Howard Krober, McPherson County, Kans.

Application August 22, 1949, Serial No. 111,717

7 Claims. (Cl. 299—83)

1

The invention relates to a combined device for dissolving and distributing fertilizer or the like in a stream of water applied to lawns or gardens through an ordinary garden hose or sprinkler and for controlling the flow of water to the sprinkler.

The primary object of the invention is to provide a valved casing which may be inserted in a hose line such as between the sillcock and the hose or between the hose nozzle and end of the hose, the casing including means for mounting a cartridge of soluble chemical fertilizer, insecticide or other material in position to retain a valve in open position to permit flow of water through the casing and over the soluble cartridge until the material is exhausted and then to permit the valve to close and shut off the water supply.

More particularly, the invention comprises a two-part tubular casing having a passage therethrough for the flow of water and a spring-pressed valve carried by one part adapted to seat on a valve seat in the other part to close the water passage, in combination with a novel cartridge of soluble material, such as chemical fertilizer, mounted in the casing in position to retain the valve from its seat and to permit closing of the valve when the soluble material is exhausted, the cartridge including an insoluble core part adapted to telescope into the hollow stem of the valve whereby the valve is retained in full open position until the block of soluble material on the core is completely exhausted and thereafter quickly closed by the sliding of the valve stem over the core part of the cartridge to shear the last vestige of soluble material therefrom.

Other objects and advantages of the invention and the specific construction of a preferred embodiment thereof will become apparent during the course of the following detailed description and reference to the accompanying drawings forming a part hereof. In the drawings, Fig. 1 is an axial section through an embodiment of the invention with the valve in open position, Fig. 2 is a side elevation, partially in section, showing the valve in closed position after exhaustion of the soluble material of the cartridge, and Fig. 3 is a side elevation of a retaining pin used to hold the valve from its seat when it is desired to pass water continuously through the device without dissolving any material therein.

Referring now more particularly to the drawings, 5 is an elongated tubular casing part, the reduced inlet end 6 of which is provided with

2 internal threads 7 for engaging the threaded end coupling 8 of a hose 9, or the same may be attached directly to a sillcock if it is desired to relieve the hose from pressure when the device stops the flow of water.

The casing part 5, which is preferably formed of brass, is provided with spaced internal shoulders 10 and 11 against which are seated apertured discs or spiders 12 and 13, formed with axial bearing bosses 14 and 15 respectively. From the shoulder 11, the casing 5 extends forwardly and at its forward end is provided with external threads 16.

The axial bearing bosses 14 and 15 provide a bearing mounting for the sliding valve stem 17 of a spring pressed valve body. The stem 17, which is preferably formed of brass tubing is closed at its inner end at 18 and extends forwardly of the spider 13. A rubber valve body 19 is mounted on the forward end of the stem 17, the latter being flanged at the end as at 20 to retain the rubber body thereon and to provide a sharp annular shearing edge 21 at the forward open end thereof. The rubber body 19 is backed up by a washer 22 which forms a seat for the end of a coil spring 23 confined between the same and the spider 13 for the purpose of biasing the valve to projected position and the forward face of the body 19 is formed with a tapered surface 24. A cross pin 18 in the inner end of the stem keeps it from sliding out completely from the bearings when the casing is opened.

A cap member 25, forming the other part of the casing is formed with an internally threaded rim 26 which is threaded on the threads 16 at the end of the casing part 5, there being a packing gasket 27 at the base of the rim for sealing the connection. From the rim 26, which may be knurled on the outer surface to afford a good grip, the cap is tapered inwardly to provide an annular valve seat 28 for engagement by the valve body 19 to close the passage through the casing as shown in Fig. 2.

From the valve seat 28, the wall of the cap is tubular and at a point spaced from the seat is reduced in diameter to form a shoulder 29 for seating a spider disk 30 formed with an axially disposed socket 31 facing the valve body and axially aligned therewith. The reduced end of the cap is externally threaded at 32 to engage the end coupling 33 of hose 34.

The socket 31 forms a seat for one end of the cylindrical core 35 of a fertilizer or other cartridge 36, the other end of the core being tapered at 37 and seated in the open end of the bore of the valve stem 17 when the parts are assembled as shown in Fig. 1. The cartridge 36 as indicated, includes the insoluble core 35, which is preferably made of a suitable plastic, upon which is molded a solid body 38 of soluble chemical fertilizer, insecticide, or other material to be dissolved in the water passing through the device. The body of soluble material 38 terminates short of the ends of the core, leaving the same exposed for seating in the socket 31 and end of the valve stem as above described, and is of sufficient length to lift the valve far enough from its seat to insure adequate flow of water when installed as shown in Fig. 1.

For the purpose of retaining the valve in open position when it is desired to use the hose for watering only without removing the device from the line, a retainer pin 39 is provided as shown in Fig. 3. This retainer pin is provided with a tapered end 40 at one end adapted to seat in the end of the valve stem 17 and has a shoulder 41 to seat the end of the stem to prevent telescoping of the same on the pin. The other end is adapted to seat in the socket 31 and when so installed the pin will hold the valve open.

In the operation of the device, with the same connected in a hose line through which it is desired to dispense a feeding or other mixture to the lawn or garden, the cap 25 is removed from the casing part 5 and a cartridge 36 of soluble material to be dispensed is inserted with one end of the core thereof seated in the socket 31 of the abutment spider 30. The cap 25 is then reassembled with the casing 5 taking care that the pointed end 37 of the core 35 seats in the end of the axial bore in the valve stem. As the parts are brought together, the end of the valve stem, or body, engaging the block of fertilizer on the core 35 will be pushed back against the tension of the spring 23 and the valve will thus be held off of its seat.

The water being turned on, the block of soluble material 38 will slowly be dissolved until only a thin coating or sleeve thereof remains on the core 35. When this coating or sleeve becomes thin enough so that the pressure of the water and of the spring 23 on the valve overcomes the resistance thereof, the valve will be pressed forward and the sharp edge 21 at the forward end of the valve stem will shear off the remainder of the material from the core as the stem telescopes onto the core. Due to the fact that only a small amount of the solid cake remaining on the core is sufficient to hold the valve open, the same will not gradually close as the cartridge dissolves, but will remain fully open until practically all of the material is used up and then quickly close as the same is exhausted.

The cartridges may be made in various sizes so that the user may select one which will last for the length of time which he desires to water the lawn or garden. After inserting the cartridge and turning on the water the device requires no further attention as the water flow will automatically be cut off when the cartridge is exhausted. While a preferred embodiment of the invention has been illustrated and described, it will be understood that various modifications in the details thereof may be resorted to without departing from the spirit of the invention within the scope of appended claims.

I claim:

1. A combined dissolver and sprinkler control device comprising a casing adapted to be connected in a hose line or the like, a valve seat in said casing, a spring pressed valve body mounted in said casing adapted to engage said seat to close the passage therethrough, said valve body having an axial bore in the end thereof, an abutment in said casing spaced from the valve body when the latter is in its seat engaging position, and a cartridge of soluble material adapted to seat at one end on said abutment and at the other end on said valve body to retain the latter lifted from its seat, said cartridge including an insoluble core serving to support said cartridge between said abutment and said valve body and adapted to telescope into the bore in said valve body to permit movement of said valve body to its seat when the soluble material is exhausted.

2. A combined dissolver and sprinkler control device comprising a tubular casing adapted to be connected in a hose line or the like, a valve seat in said casing, a spring pressed valve body mounted for axial movement in said casing into engagement with said valve seat and having an axial bore in the end thereof, an abutment in said casing spaced from the valve body, a cartridge of soluble material adapted to seat on said abutment and to engage the valve body to retain the same lifted from its seat against the action of the spring, said cartridge having an insoluble core shaped to have a sliding fit in the axial bore in the end of said valve body and serving to support said cartridge between said abutment and said valve body.

3. A combined dissolver and sprinkler control device comprising a tubular casing adapted to be connected in a hose line or the like, said casing having a valve seat formed therein and a spring pressed valve member adapted to engage said seat to close the passage through said casing, said valve including an axial stem hollow at the end adjacent the valve seat, a cartridge including a central elongated insoluble core member dimensioned to have a sliding fit in the end of said valve stem and a cake of soluble material surrounding said core member, means for mounting said cartridge in said casing with said core member disposed in axial alignment with said valve stem and the open end of said valve stem engaging the end of the cake of soluble material to retain the valve in retracted position.

4. A combined dissolver and sprinkler control device comprising a tubular casing adapted to be connected at one end to a hose line or the like for the supply of water under pressure to said casing, spaced abutments in said casing having axial openings therethrough, a valve body including an axial stem extending through the bores in said abutments and slidable therein, a spring between one of said abutments and said valve body for biasing said valve body to projected position toward the other end of said casing, a removable tubular cap for said other end of said casing having an axial outlet passage therethrough, an annular valve seat carried by said cap adapted to seat said valve body to close the passage therethrough, an abutment in the outlet passage of said cap, and a cartridge of soluble material adapted to seat on said abutment spaced from the wall of said cap to permit the free flow of water around and over the same and to engage said valve body to retain the latter in retracted position lifted from its seat.

5. A combined dissolver and sprinkler control device comprising a tubular casing adapted to be connected at one end to a hose line or the like, spaced abutments in said casing having axial openings therethrough, a valve body including an axial stem extending through the bores in said abutments and slidable therein, said stem extending through said valve body and having an axial bore opening at the forward end thereof, a spring between one of said abutments and said valve body for biasing said valve body to projected position, a cap for the other end of said casing having a passage therethrough, an annular valve seat carried by said cap adapted to seat said valve body to close the passage therethrough, an abutment in said cap, and a cartridge of soluble material adapted to seat on said abutment and engage said valve body to retain the latter in retracted position lifted from its seat, said cartridge including an axial core member having a projecting end adapted to seat in the end of the bore in said valve stem and said valve stem being adapted to telescope onto said core to strip the remaining soluble material therefrom when said valve moves to projected position upon exhaustion of said cartridge.

6. A combined dissolver and sprinkler control device comprising a tubular casing adapted to be connected at one end thereof to a hose line or the like for the supply of water under pressure thereto, means in said casing providing an axial guide for a valve stem, a valve body including an axial stem slidable in said guide, spring means biasing said valve in the direction of the other end of the casing, a removable cap for the end of the casing having an outlet passage therethrough, an annular valve seat carried by said cap in the path of movement of said valve body adapted to seat said valve body to close the outlet passage, and means providing a seat in said cap for a body of soluble material and for retaining the same centered therein in position to engage said valve body to restrain the same from engaging said valve seat and to permit the free flow of water around and over said body of soluble material.

7. A combined dissolver and sprinkler control device comprising a tubular casing adapted to be connected in a hose line or the like for the supply of water under pressure to one end thereof, means in said casing providing an axial guide for a valve stem, a valve body including an axial stem slidable in said guide, spring means biasing said valve toward the other end of the casing, a removable cap for the last mentioned end of the casing having an axial outlet passage therethrough, an annular valve seat in said cap adapted to seat said valve body to close said passage, an abutment in said passage adapted to support a body of soluble material projecting above said valve seat to engage said valve body to restrain the latter from engagement with said seat until the soluble body is dissolved by water flowing through the casing and over the same to the outlet passage in the cap.

NOBLE R. CARLSON.

REFERENCES CITED

The following references are of record in the file of this patent:

UNITED STATES PATENTS

| Number | Name | Date |
|---|---|---|
| 563,921 | Gridley | July 14, 1896 |
| 577,121 | Stock et al. | Feb. 16, 1897 |
| 1,469,065 | D'Arcy | Sept. 25, 1923 |
| 1,486,775 | McGrath | Mar. 11, 1924 |
| 2,347,202 | Lindsay | Apr. 25, 1944 |
| 2,347,203 | Lindsay | Apr. 25, 1944 |
| 2,347,204 | Lindsay | Apr. 25, 1944 |